United States Patent
Hepp et al.

(10) Patent No.: US 11,093,470 B1
(45) Date of Patent: Aug. 17, 2021

(54) MULTIPLE DIMENSION LAYERS FOR AN ANALYSIS DATA SYSTEM AND METHOD

(71) Applicant: The Rejuvi Venture, LLC, Eagan, MN (US)

(72) Inventors: Regina Hepp, Eagan, MN (US); Vidyotham Reddi, Medina, MN (US); Robin Lindbeck, Pocatello, ID (US)

(73) Assignee: The Rejuvi Venture, LLC, Eagan, MN (US)

( * ) Notice: Subject to any disclaimer, the term of this patent is extended or adjusted under 35 U.S.C. 154(b) by 4 days.

(21) Appl. No.: 16/787,193

(22) Filed: Feb. 11, 2020

(51) Int. Cl.
| | |
|---|---|
| *G06F 16/22* | (2019.01) |
| *G06F 16/2457* | (2019.01) |
| *G06Q 10/06* | (2012.01) |
| *G06F 16/242* | (2019.01) |
| *G06F 16/248* | (2019.01) |

(52) U.S. Cl.
CPC ........ *G06F 16/2237* (2019.01); *G06F 16/244* (2019.01); *G06F 16/248* (2019.01); *G06F 16/2457* (2019.01); *G06Q 10/06393* (2013.01)

(58) Field of Classification Search
CPC .............. G06F 16/2237; G06F 16/244; G06F 16/2457; G06F 16/248; G06Q 10/06393
USPC .......................................................... 707/736
See application file for complete search history.

(56) References Cited

U.S. PATENT DOCUMENTS

| | | | | |
|---|---|---|---|---|
| 8,386,484 | B2* | 2/2013 | Lessing | G06F 40/143 707/736 |
| 2006/0167784 | A1* | 7/2006 | Hoffberg | G06Q 50/188 705/37 |
| 2008/0120129 | A1* | 5/2008 | Seubert | G06Q 10/10 705/35 |
| 2008/0274905 | A1* | 11/2008 | Greene | G01N 21/6428 506/4 |
| 2009/0138415 | A1* | 5/2009 | Lancaster | G06N 5/04 706/11 |
| 2010/0317420 | A1* | 12/2010 | Hoffberg | G07F 17/323 463/1 |
| 2013/0054603 | A1* | 2/2013 | Birdwell | G06K 9/6253 707/738 |
| 2021/0072122 | A1* | 3/2021 | Chou | G01N 1/2813 |
| 2021/0090694 | A1* | 3/2021 | Colley | G16H 20/40 |

* cited by examiner

*Primary Examiner* — Dung K Chau
(74) *Attorney, Agent, or Firm* — Forsgren Fisher; Daniel A. Tysver; James M. Urzedowski

(57) ABSTRACT

A system and method are presented that analyze evaluation data concerning a subject using attributes that are logically arranged in a geometric structure such as a rectangular array. A plurality of dimension layers is laid on top of the logical arrangement of data. Each dimension layers assigns values to a plurality of dimensions based on the value of neighboring attribute groups. Each dimension layer can be associated with one or more reporting configurations that contain descriptors for the defined dimensions as well as formatting instructions for report-like output.

20 Claims, 13 Drawing Sheets

Fig. 4

| West (Sustain) Set of Attributes | # | East (Build) Set of Attributes | # |
|---|---|---|---|
| Produces an environment filled with energy, drive and a will to finish | 72 | Highlights individual and team contributions to ensure their visibility and value | 36 |
| Celebrates milestone and metric accomplishments for team members, customers and results | 71 | Finds multiple ways to describe both why and how the business will move forward | 35 |
| Maintains go-forward energy of self, individuals and teams | 70 | Creates a sense of urgency for the business' intent and priorities | 34 |
| Demonstrates passion and hope for the business | 69 | Defines and communicates the business' intent and priorities | 33 |
| Unwaveringly safeguards property, intellectual capital and other business assets | 68 | Continually adjusts strategies to keep performance strong | 32 |
| Quickly diagnoses complex scenarios and recognizes when to adjust | 67 | Considers what-if scenarios and works across the business to create contingency plans | 31 |
| Understands triggers that inform accuracy of the competitive landscape | 66 | Recognizes obstacles and swiftly ensures the business addresses them | 30 |
| Uses both information and intuition to create context in times of ambiguity | 65 | Minimizes risk through strong business planning | 29 |
| Plans and executes work that is mindful of team members, customers and results | 64 | Is quick to act on teachable moments for self, individuals and teams | 28 |
| Sees and maximizes every business lever | 63 | Develops higher-order and win-win solutions | 27 |
| Effectually times the shift from analysis to recommendation and recommendation to solution | 62 | Moves the business at the speed of its competitive landscape | 26 |
| Leverages vision and mission as decision-making guideposts | 61 | Balances thinking between where the business is with where it can be | 25 |
| Generates an environment that allows others to bring their best performance | 60 | Gains enterprise-wide confidence and trust | 24 |
| Inspires at all stages of solution ideation, planning and implementation | 59 | Builds individual and team mastery through the right assignments and the right recognition | 23 |
| Values people as the business' competitive advantage | 58 | Drives engagement by linking objectives and strategies to vision and mission | 22 |
| Sets a tone of excellence and high expectations | 57 | Possesses a clear bias for action | 21 |
| Respectfully addresses issues without bias | 56 | Moves critical conversations forward | 20 |
| Talks-through the impact of direction and decisions | 55 | Creates a positive, personal experience at every point of contact | 19 |

Dimension Layer A

| | | | | | | | |
|---|---|---|---|---|---|---|---|
| 69 | 70 | 71 | 72 | 36 | 35 | 34 | 33 |
| 65 | 66 | 67 | 68 | 32 | 31 | 30 | 29 |
| 61 | 62 | 63 | 64 | 28 | 27 | 26 | 25 |
| 57 | 58 | 59 | 60 | 24 | 23 | 22 | 21 |
| 53 | 54 | 55 | 56 | 20 | 19 | 18 | 17 |
| 49 | 50 | 51 | 52 | 16 | 15 | 14 | 13 |
| 45 | 46 | 47 | 48 | 12 | 11 | 10 | 9 |
| 41 | 42 | 43 | 44 | 8 | 7 | 6 | 5 |
| 37 | 38 | 39 | 40 | 4 | 3 | 2 | 1 |

710 — Sustain A 36
720 — Build A 36
300
700

Dimension Layer B

300 — Drive B 36 — 910

| 69 | 70 | 71 | 72 | 36 | 35 | 34 | 33 |
| 65 | 66 | 67 | 68 | 32 | 31 | 30 | 29 |
| 61 | 62 | 63 | 64 | 28 | 27 | 26 | 25 |
| 57 | 58 | 59 | 60 | 24 | 23 | 22 | 21 |
| 53 | 54 | 55 | 56 | 20 | 19 | 18 | 17 |
| 49 | 50 | 51 | 52 | 16 | 15 | 14 | 13 |
| 45 | 46 | 47 | 48 | 12 | 11 | 10 | 9 |
| 41 | 42 | 43 | 44 | 8 | 7 | 6 | 5 |
| 37 | 38 | 39 | 40 | 4 | 3 | 2 | 1 |

Think B 36 — 920

900

Drive 4.90

Think 4.03

1000

Dimension Layer D

| 69 | 70 | 71 | 72 | 36 | 35 | 34 | 33 |
| 65 | 66 | 67 | 68 | 32 | 31 | 30 | 29 |
| 61 | 62 | 63 | 64 | 28 | 27 | 26 | 25 |
| 57 | 58 | 59 | 60 | 24 | 23 | 22 | 21 |
| 53 | 54 | 55 | 56 | 20 | 19 | 18 | 17 |
| 49 | 50 | 51 | 52 | 16 | 15 | 14 | 13 |
| 45 | 46 | 47 | 48 | 12 | 11 | 10 | 9 |
| 41 | 42 | 43 | 44 | 8 | 7 | 6 | 5 |
| 37 | 38 | 39 | 40 | 4 | 3 | 2 | 1 |

1310 Do D 24
1320 Know D 24
1330 See D 24

Fig. 17

Dimension Layer F

| 69 | 70 | 71 | 72 | 36 | 35 | 34 | 33 |
|----|----|----|----|----|----|----|----|
| 65 | 66 | 67 | 68 | 32 | 31 | 30 | 29 |
| 61 | 62 | 63 | 64 | 28 | 27 | 26 | 25 |
| 57 | 58 | 59 | 60 | 24 | 23 | 22 | 21 |
| 53 | 54 | 55 | 56 | 20 | 19 | 18 | 17 |
| 49 | 50 | 51 | 52 | 16 | 15 | 14 | 13 |
| 45 | 46 | 47 | 48 | 12 | 11 | 10 | 9  |
| 41 | 42 | 43 | 44 | 8  | 7  | 6  | 5  |
| 37 | 38 | 39 | 40 | 4  | 3  | 2  | 1  |

Overall F 72

Fig. 18

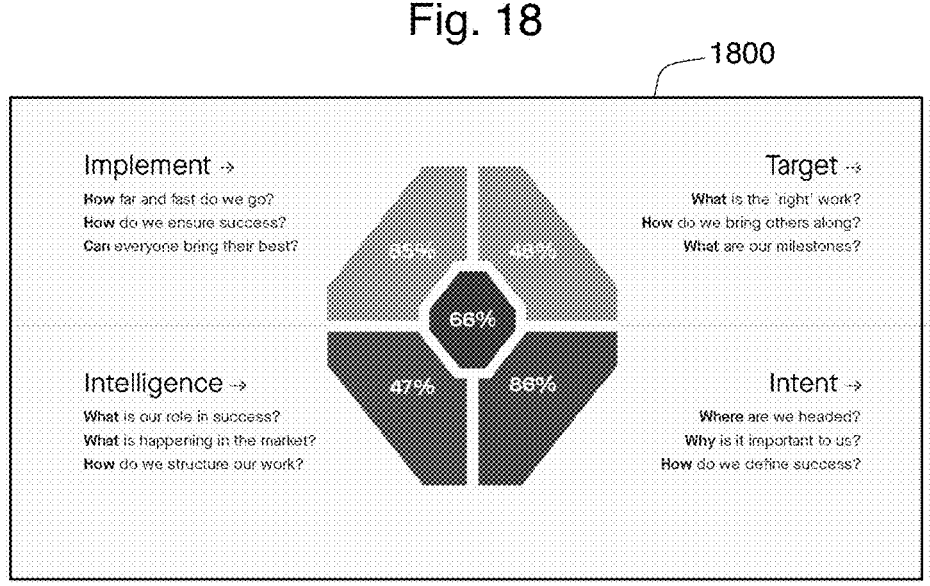

Implement →
How far and fast do we go?
How do we ensure success?
Can everyone bring their best?

Target →
What is the 'right' work?
How do we bring others along?
What are our milestones?

Intelligence →
What is our role in success?
What is happening in the market?
How do we structure our work?

Intent →
Where are we headed?
Why is it important to us?
How do we define success?

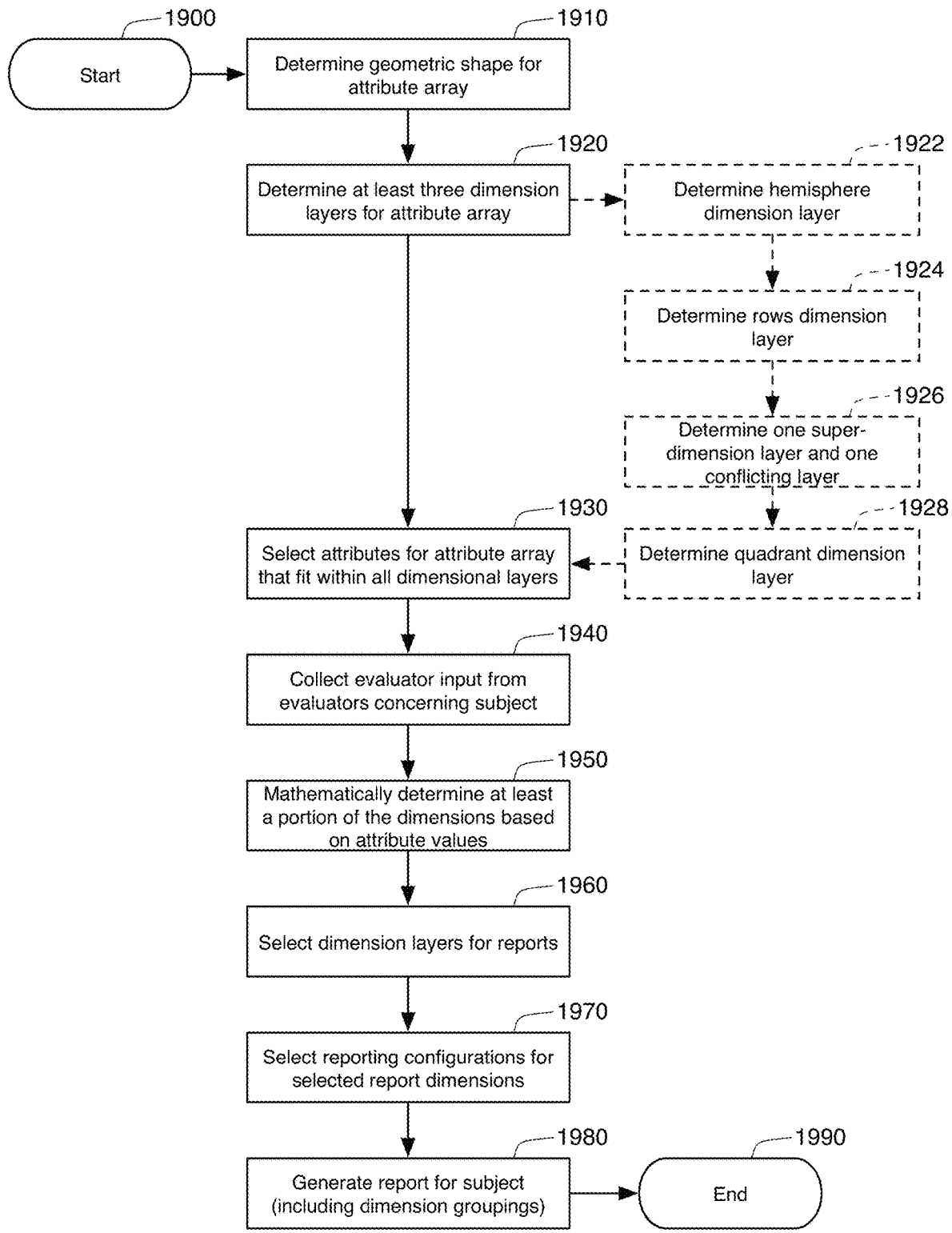

MULTIPLE DIMENSION LAYERS FOR AN ANALYSIS DATA SYSTEM AND METHOD

FIELD OF THE INVENTION

The present application relates to the field of data storage and the use of a logical geometric arrangement of attribute data to allow for the use of overlaid dimension layers in the analysis of that data.

SUMMARY OF THE INVENTION

The present application presents a unique system and method for analyzing evaluation data concerning a subject. Evaluators are asked to rate the subject on a variety of attributes. These attributes are predetermined and are logically arranged in a geometric structure such as a rectangular array. The data does not need to be stored in a true array data structure, but it should be logically arranged so that each attribute has at least one neighboring attribute in the logical structure.

A plurality of dimension layers is laid on top of the logical arrangement of data in order to assign dimensions based on the value of the attributes. These dimension layers assign a plurality of dimensions based on an aggregation analysis of a group of neighboring attributes in the logical arrangement. In at least one embodiment, all of the dimensions assigned in a dimension layers are associated with the same number of attributes. In that same embodiment, all attributes in the geometric structure are assigned to one and only one of the dimensions in that dimension layer.

In the preferred embodiment, some of the dimension layers assign dimensions that comprise super-dimensions that are each associated with a plurality of dimensions assigned in another dimension layer. Other dimension layers define their dimensions in such a way as to conflict with the defined dimensions of other dimension layers.

Each dimension layer can be associated with one or more reporting configurations. The reporting configurations contain descriptors for the defined dimension layers as well as formatting instructions for report-like output concerning the defined dimensions.

BRIEF DESCRIPTION OF THE DRAWINGS

FIG. 4 is a first portion of a table showing an example set of attributes assigned to the attribute data array of FIG. 3.

FIG. 17 is a schematic view of a dimension layer dividing the attributes of the data array of FIG. 3 into a single dimension.

FIG. 18 is a user interface utilizing the dimension created by the dimension layer of FIG. 17.

FIG. 19 is a flow chart showing a process of utilizing a plurality of dimension layers on an attribute array to define dimensions.

DETAILED DESCRIPTION

Data Attributes and Dimensions

Figure 1:
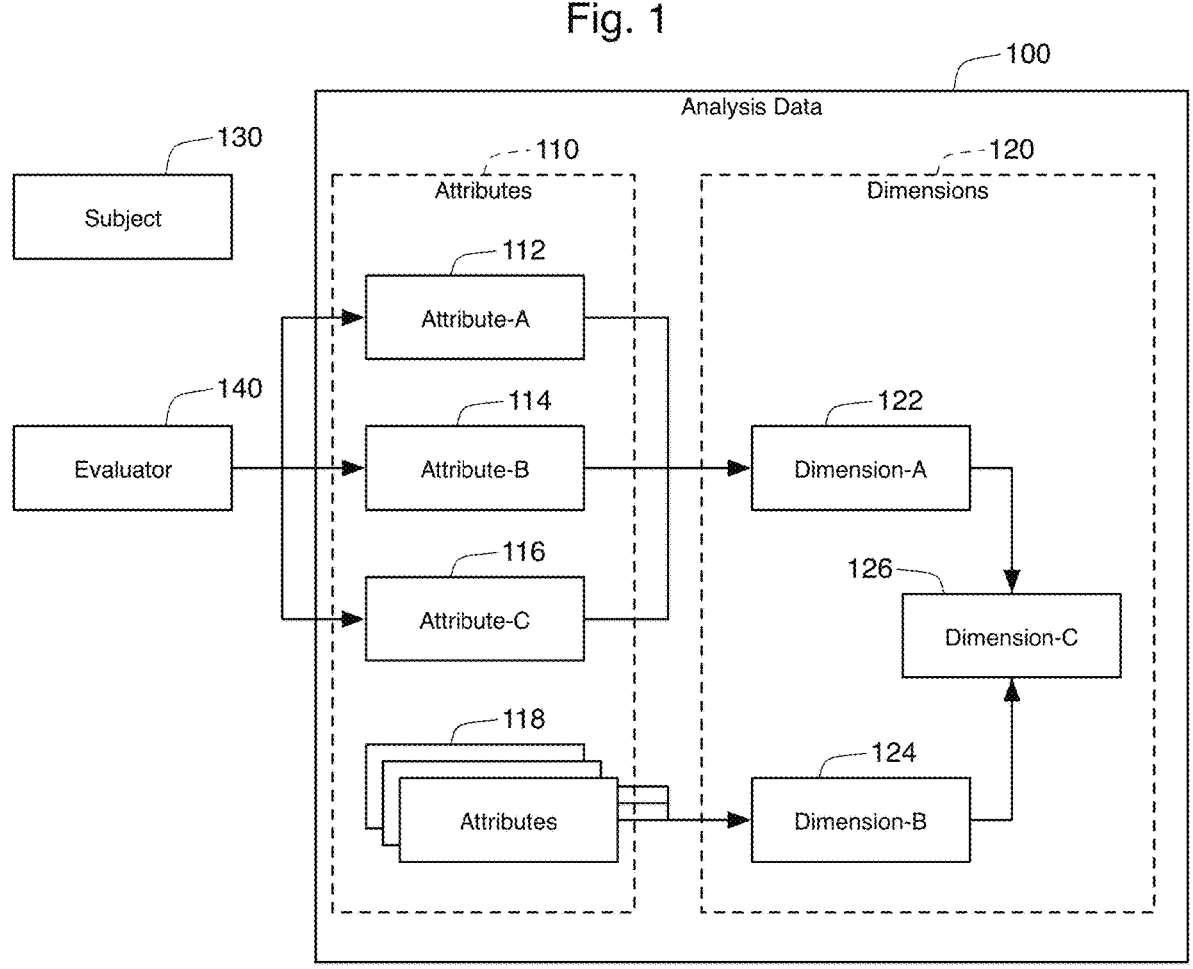
FIG. 1 is a schematic view of a system for analyzing attributes and dimensions assigned to a subject.

Data in computer systems frequently takes the form of analysis data concerning a subject. FIG. 1 provides a schematic illustration of this, with analysis data 100 being developed concerning subject 130. The subject 130 can be anything that can be rated by individuals, such as another individual, a consumer good, a service, or even a location. In its simplest form, analysis data 100 can take the form of a rating of the subject 130, such as a five-star rating for a hotel.

In order to collect the data 100, individuals are solicited in order to act as evaluators 140 that provide opinions and ratings on the subject 130. In the preferred embodiment, the evaluators 140 rate the subject 130 on a variety of attributes 110, such as attribute-A 112, attribute-B 114, and attributed-C 116, as shown in FIG. 1. For example, if the subject 130 of an evaluation is a leader in an enterprise, a person that works for that leader (the evaluator 140) might be asked to rate their boss on attributes 110 such as their ability to "encourage new ideas" and to "build a culture that leverages diversity of thinking." If a product or service were being evaluated as subject 130, customers and potential customers 140 would be asked to rate the product/service 130 on attributes 110 such as desirability, appearance, usefulness, etc. A hotel 130 might be rated on the attributes 110 of "cleanliness of the bathroom," "friendliness of the front desk," etc.

While attribute data 110 is very useful, the amount of data that needs to be collected to perform a comprehensive evaluation of a subject 130 can be overwhelming. People requested to do ratings on hundreds of individual attributes can encounter rating fatigue, where minds wander and answers are no longer thoughtfully given.

As a partial answer to such data gathering fatigue, it can be useful to combine multiple attributes 110 together into evaluative "dimensions" 120. For example, evaluators may be asked to comment on the cleanliness of the hotel room's bathroom 112, its bed 114, and its floors 116. These separate attributes 112-116 might be combined into a single Dimension-A 122 indicative of the overall cleanliness of the hotel room. This combination can be created mathematically, where the scores of the separate attributes 112-116 are averaged (or otherwise aggregated) together into a single score for Dimension-A 122. In other embodiments, Dimension-A-122 is used in the user interface to visually group together those attributes 112-116 that related to that single dimension 122. If separate attributes 112-116 are grouped together in the user interface under a heading "cleanliness of the hotel room," the user can visually see all three dimensions 112-116 simultaneously and quickly understand the overall cleanliness of the hotel room—especially if the scores for the individual attributes 112-116 are graphically represented on the user interface. Other attributes 118 relating to the cleanliness of the hotel lobby, elevators, and hallways could be combined into a different dimension (dimension-B 124) indicative of the overall cleanliness of the common areas of the hotel. These two dimensions 122, 124 could likewise be combined into third dimension (dimension-C 126) relating to overall cleanliness of the hotel. Of course, use of a simple hierarchy to group attributes 110 into dimensions 120, then then grouping multiple first-level dimensions 122-124 into higher level "super" dimensions 126 does only a little to reduce the overall need for a user to rate a subject on numerous, separate attributes 110.

System 200 and Structured Array 300

The present invention provides an improved structure for developing dimensions 120 in computerized analysis data 100 through the use of multiple dimension layers that logically sit on top of a sheet or array of attribute data 110. This invention can be implemented using system 200 shown in FIG. 2. System 200 uses a server 210, which comprises one or more standard computer systems that each contain a processor 212, memory or storage 214, and computer programming instructions or code 216. Typically, the code 216 will be stored on a non-volatile, non-transitory portion of the computer memory/storage 214, such as a hard drive or flash memory device. The memory 214 on a server computing device 210 will also include random access memory, or RAM, which is volatile but faster than most non-volatile memories. RAM memory 214 is used by the processor 212 for the code and data that is currently being processed. The processor 212 is typically a general-purpose CPU, such as those manufactured by Intel Corporation (Mountain View, Calif.) or Advanced Micro Devices, Inc. (Sunnyvale, Calif.). The code 216 includes special purpose code to operate the methods and procedures described below. The code 216 also includes a general-purpose operating system such as LINUX (available from multiple companies under open source licensing terms), WINDOWS (available from Microsoft Corporation of Redmond, Wash.), or Mac OS (available from Apple, Inc of Cupertino, Calif.).

The server 210 is designed to create, access, maintain, and update a set of structured data 220. This data 220 can take the form of a standard database, such as a relational or object-oriented database. The structured data 220 can be stored locally within one or more of the servers 210. Alternatively, the structured data can be managed and controlled by a separate database server that responds to queries initiated by the server computing device(s) 220 as needed. When implemented as a database, the data 220 can also be associated with database programming (not shown) that helps to access and maintain the structured data 220.

Figure 2:
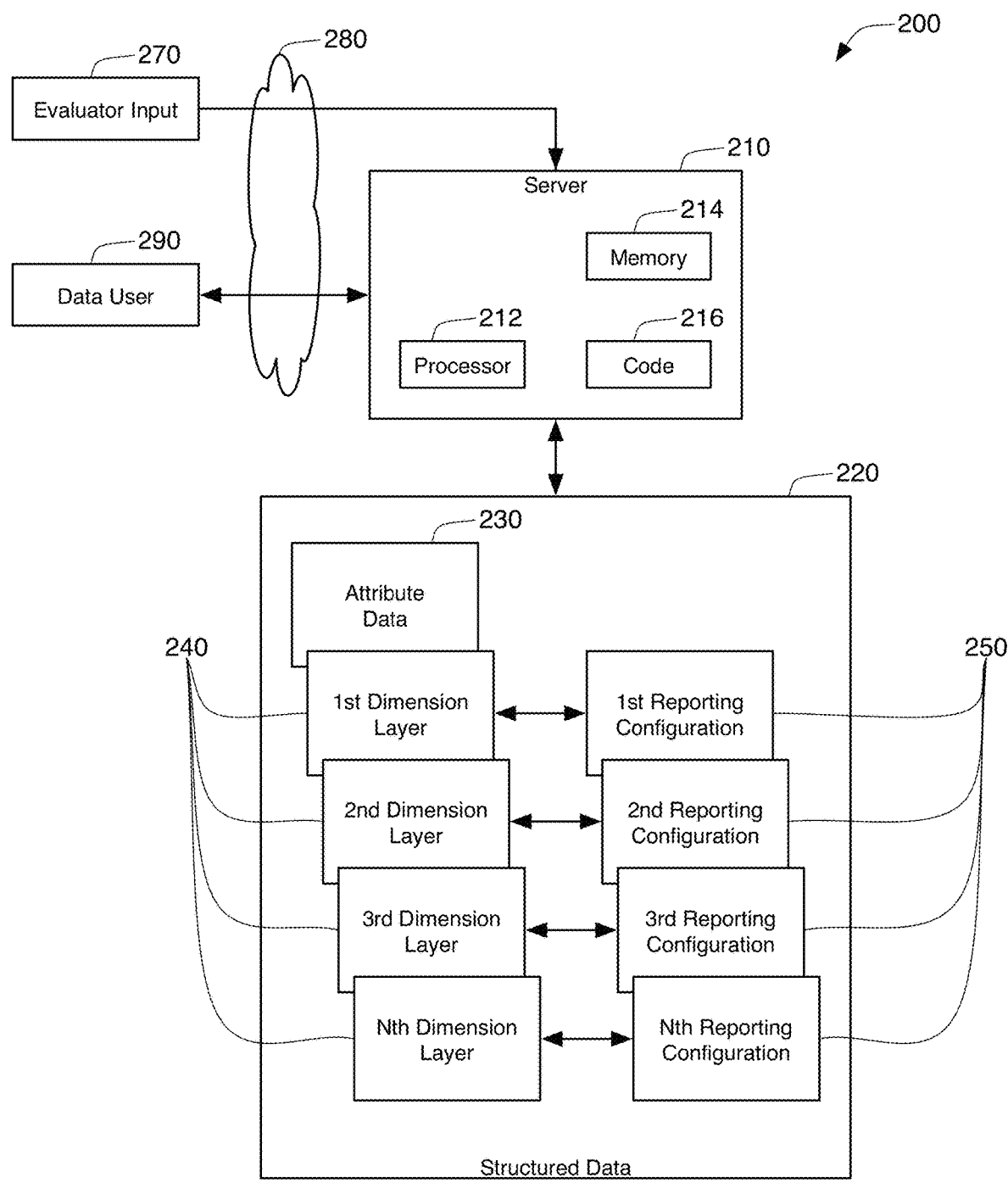
FIG. 2 is a schematic view of a second embodiment system in which multiple dimension layers are layered over attribute data.

The structured data 220 will include attribute data 230 that contains a plurality of evaluation attributes 110. This attribute data 230 will generally be received as input from one or more evaluators 140. In FIG. 2, the inputted data received from the evaluators 140 is shown as evaluator input 270. Evaluator input 270 can consist of data that is accumulated outside of system 200 and then submitted to the server 210 in bulk. In other embodiments, the evaluator input 270 is received from each separate evaluator 140 individually. To accomplish this, the server 210 communicates with one or more evaluator computing devices over a network 280 in order to receive the evaluator input 270. The server 210 may provide an interface for the receipt of this data 270, such as that provided by a website operating on the World Wide Web or by dedicated apps or applications operating on the evaluator computing devices. In one embodiment, the network 280 is a wide area network such as the Internet or a TCP/IP-based Intranet. In this type of embodiment, the server computing device(s) 210 will contain a network interface (not shown) that includes TCP/IP protocol stacks for communicating over the network 280.

The evaluator computing devices might take the form of standalone computers such as a desktop or laptop computer. Alternatively, the evaluator computing devices might be mobile devices, such as mobile phones or tablet computers. In yet another embodiment, the evaluator computing devices can take the form of a terminal that interacts with a central mini or mainframe computer. As is known in the art, dedicated applications and apps are able to communicate with remote servers (such as server 210) in order to receive user interfaces and to receive and submit data. In some embodiments, the evaluator input 270 is received from multiple sources, such as a combination of a bulk data transfer, individual input from standalone computers, and individual input through mobile devices.

Figure 3:
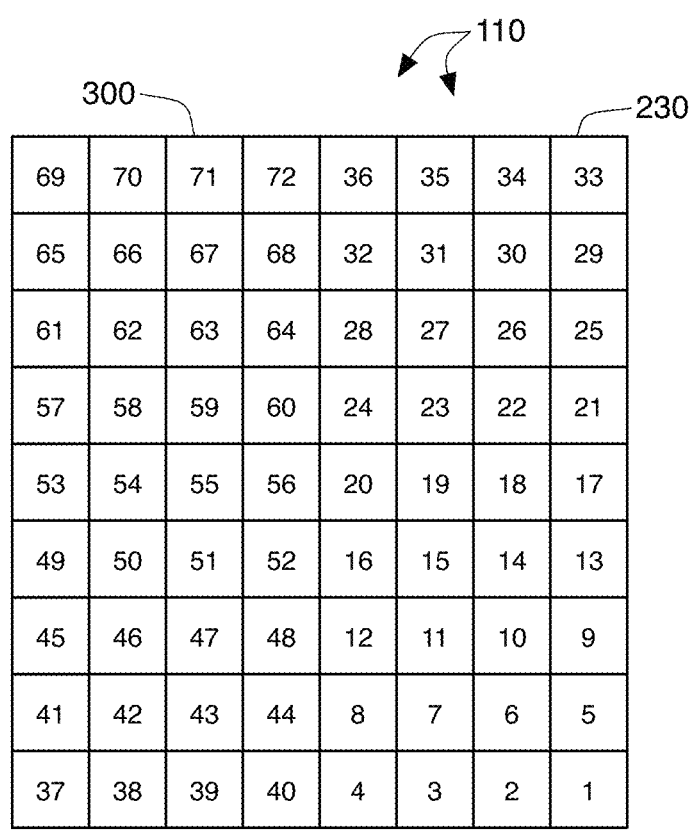
FIG. 3 is a schematic view of an attribute data array.

The evaluator input data 270 is stored in database 220 as attribute data 230. As shown in FIG. 3, one embodiment of the present invention stores the attribute data 230 in a structured 2D array 300. This array specifically locates each attribute 110 into a known location of the array 300. The numbers shown on array 300 in FIG. 3 represent the individual array elements or attributes 110 that make up this array. As can be seen in this figure, the array 300 of attributes 110 constitutes an 8×9 array of seventy-two separate attributes 110, with each attribute 110 being separately numbered.

The structure and organization of the attributes 110 into this array 300 is used to develop the plurality of dimension layers 240 described below. However, it is not necessary that the database 220 or other structured data 220 that contain this array 300 actually utilize a formal, multi-dimensional array in a programming sense. A multi-dimensional array provides a data structure that is able to access data elements through more than a single index. For example, array[index] is a 1D data array where individual data elements can be accessed by using an index (typical a whole number). Similarly, array[index1, index2] is a 2D array accessed through two (numerical) indexes and array[index1, index2, index3] is a 3D array requiring three indexes to access an element of data.

Because each attribute 110 in array 300 has a unique number, and because the location of an attribute 110 in the array 300 does not change, it would be possible to implement this array 300 using a single dimensional array with an index from 1 to 72. Furthermore, it would not be necessary to even implement the attribute array 300 as an actual array when programming and implementing this system 200. In other words, the attribute array 300 is a conceptual, 8×9 array of datapoints, with each datapoint being an attribute 110 evaluating a subject 130 on a particular datapoint or factor. The conceptual array 300 shows the arrangement of these attributes 110, with "neighbor" attributes 110 in FIG. 3 sharing commonalities. A neighbor is an attribute 110 that shares a side with another attribute 110 as they are laid out in the conceptual array 300. For example, the attribute associated with number 1 is a neighbor of attributes with numbers 2 and 5. A group of neighboring attributes 110 will all share at least one side in the array 300 with other members of that group. For example, attributes 1-8 all form part of a group of neighboring attributes 110.

In at least one embodiment, the dataset 300 is stored in a relational database with each attribute 110 (or square in the array) being associated with a reference numeral. The reference numerals are then conceptualized into the array shape even while the data itself is stored in one or more data tables outside of a structural programming array. In other embodiments, the conceptual array 300 need not be exactly 8×9 in size. For example, an 8×8 array or a 6×10 array shape is possible. Nonetheless, the inventors have utilized an 8×9 array in the context of evaluating leadership attributes in at least three different contexts, so the 8×9 shape of the attribute array 300 will be shown for most of the following description.

Each of the attributes 110 in the array 300 is carefully selected so that the datapoint can be strategically combined with neighboring attributes in the data array 300 into multiple dimensions 120 using the dimension layers 240. The dimensions layers 240 are shown in FIG. 2 as being "stacked" on top of the structured attribute data 230 because each layer 240 can overlay the attribute data 230 in order to group or combine the attributes 110 in data 230 into a unique set of dimensions 120. The process of this grouping is described in further detail below. At this point, it is important just to recognize that each dimension layer 240 separately groups the individual attributes 110 into its own set of dimensions 120. This is not an example of hierarchical super-dimensions in which dimensions 120 are formed by combining the analysis of other dimensions 120 (such as dimension 126 in FIG. 1). Rather, each separate dimension layer 240 independently analyzes the data associated with each attribute 110, groups the attributes 110 together according to the details of the dimension layer 240, and then creates its own set of dimensions 120 for analysis and reporting. However, as explained below, it is possible that one of the dimension layers 240 will effectively be formed as super-dimensions of dimensions 120 found in another dimension layer 240, even though each dimension layer 240 defines its dimensions 120 according to the attributes 110 in array 300.

In this context, it is essential that each attribute 110 existing within the attribute array 300 be carefully selected in light of the plurality of dimension layers 240 that will be applied to the attribute array. If a particular attribute 110 is going to be grouped with a first neighbor in the data array 300 into a dimension 120 when using a dimension layer 240, then that attribute 110 must share commonalities with that first neighbor in order for the resulting dimension 120 to have any real-world value. In a different dimension layer 240, that attribute 110 will not be grouped with the first neighbor but will be grouped with a second neighbor. In this second dimension layer 240, attribute 110 must be distinguishable from the first neighbor and have commonalities with the second neighbor in order for the second dimension layer 240 to be valuable. This will also be explored in more detail below.

Because each dimension layer 240 presents different dimensions 120 on the same structured attribute data 230, the use of the multiple dimension layers 240 allows more analysis to be created on a smaller set of attribute data 230. As a result, each evaluator 140 need only complete a limited number of attribute 110 assignments for the subject 130. In the embodiment using the 8×9 attribute array 300, each evaluator 130 is asked to assign separate values for seventy-two attributes 110. Depending on the evaluation, each assigned value can be simple yes/no or true/false value, or can be selected from a range or scale of values (such as a 1-5 or an A to F grade). In the preferred embodiment, the values assigned to the attributes 110 range from 1 to 7.

In the preferred embodiment, multiple evaluators 140 will submit data 270 on each of these seventy-two attributes 110 for a single subject 130. The varying values assigned to the attributes 110 by multiple evaluators 140 can be averaged together to form a single value for that attribute 110. In some embodiments, the evaluators are grouped together into types to allow for separate evaluations based on these types. For example, if a leader in an organization is the subject 130, individuals that directly report to that leader 130 can submit evaluation data, as can peers and superiors to that leader. Direct reports can be grouped into a single type of evaluator 140, peers into another, and superiors into a third. The different evaluations of these different types of evaluators 140 can then be analyzed separately.

Each of the dimension layers 240 evaluate these 72 attributes into a different set of dimensions. As described below, it is possible to associate a separate reporting configuration 250 with each dimension layer 240. These configurations 250 contain titles and descriptors for each of the dimensions 120 defined by their associated dimension layer 240. For instance, if one dimension layer 240 equally divides the seventy-two attributes 110 in array 300 into four separate dimensions 120, the associated reporting configuration 250 will provide a name and/or title for each dimension 120, and will provide explanatory descriptions for each dimension 120. Furthermore, the reporting configuration 250 can provide formatting instructions for any reports that are to be generated when a particular dimension layer 240 is used. In this way, a user can select one, multiple, or all of the dimension layers 240, and a report can be automatically generated based on the reporting configurations 250 associated with the selected dimension layers 240.

The server 210 is responsible for providing the data and reports generated through the use of the structured attribute data 230, the dimension layers 240 and the reporting configurations 250 to one or more data users 290. Data users 290 are individuals or organizations that want to develop a better understanding of the evaluator input data 270 received by the system 200. The data user 290 can access the server 210 over network 280, which can be the same network 280 (such as the Internet) that was used to receive the evaluator input 270. Each data user 290 can have a computing device, such as a standalone computer or a mobile device, that accesses user interfaces and reports generated by the server 210. In this way, an enterprise, for example, may request the evaluation of a subject 130, such as a product, service, or employee. If the array of attributes 300 has been previously created, and data layers 240 and associated reporting configurations 250 have been defined, all that would be necessary is to obtain evaluator input 270 for the 72 attributes in the array 300. Once acquired, the multiple dimension layers 240 would be applied to the attribute array 300, dimension sets would be defined for each layer 240, and then reporting configurations 250 would create the appropriate reporting output for the requesting enterprise.

Note that FIG. 2 shows dimension layers 240 and reporting configurations 250 as separate entities within the structured data 220. This is, of course, a possible method to implement the present invention. If the structured data 220 were stored in a relational database, the dimension layers 240 and the reporting configurations 250 could be stored within separate but related tables in the database 220. It is not necessary, however, for the reporting configurations 250 to be stored in a separate data structure than the dimension layer 240. They are shown separately in FIG. 2 only for ease in understanding, as all data contained in the reporting configurations 250 could be stored within their associated dimension layer 240.

Table of Sample Attributes 400

Figure 5:
FIG. 5 is a second portion of the table shown in FIG. 4.

FIG. 4 shows a first portion 402 of a table 400 of sample attributes 110. The second portion 404 of table 400 is shown in FIG. 5. This table 400 includes seventy-two attributes 110 that were carefully considered and organized so as to fit within the attribute array 300 and to make sense with the pre-defined dimension layers 240. Each attribute 110 is associated with a number 111, which represents the location of the attribute 110 in the 8×9 attribute array 300. The attributes 110 are divided in both FIGS. 4 and 5 into a west side 410 and an east side 420, with attribute numbers 1-36 being part of east side 420 and attribute numbers 37-72 being part of the west side 410. This reflects the physical layout of the attributes in the array 300 of FIG. 3, with attributes 1-36 being on the right (or east) side of the array 300 and attributes 37-72 on the left (or west) side of the array.

The attributes 110 in table 400 all relate to a subject 130 that is being evaluated for their executive leadership skills in an enterprise. If a different type of subject 130 were selected, or the purpose for the evaluation were different, the attributes 110 used to complete the attribute array 300 would be different. For example, the inventors of the present invention have created sets of attributes 110 for executive leadership skills, for sales leadership skills, and for service leadership skills. When the focus of the evaluation of the subject 130 differs, different sets of seventy-two attributes 110 are evaluated by the evaluators 140. Nonetheless, even though different sets of attributes 110 are used (with set 400 being used for executive leadership skills), dimension layers 240 and reporting configurations 250 are still used to create a more thorough and complete analysis of the subject 130. In fact, even when different attribute sets are used for different subjects or evaluation focuses, the dimension layers 240 will frequently group the same attributes together (such as combining attributes 1-36 into a first dimension 120 and attributes 37-72 into a second dimension), even though the description of the created dimensions 120 that are included in the reporting configurations 250 will change as necessary. Note that in the following description, the attribute set shown in table 400 is sometimes referred to using figure number 400, as in "the executive leadership attributes 400."

Dimension Layers 240

Figure 6:
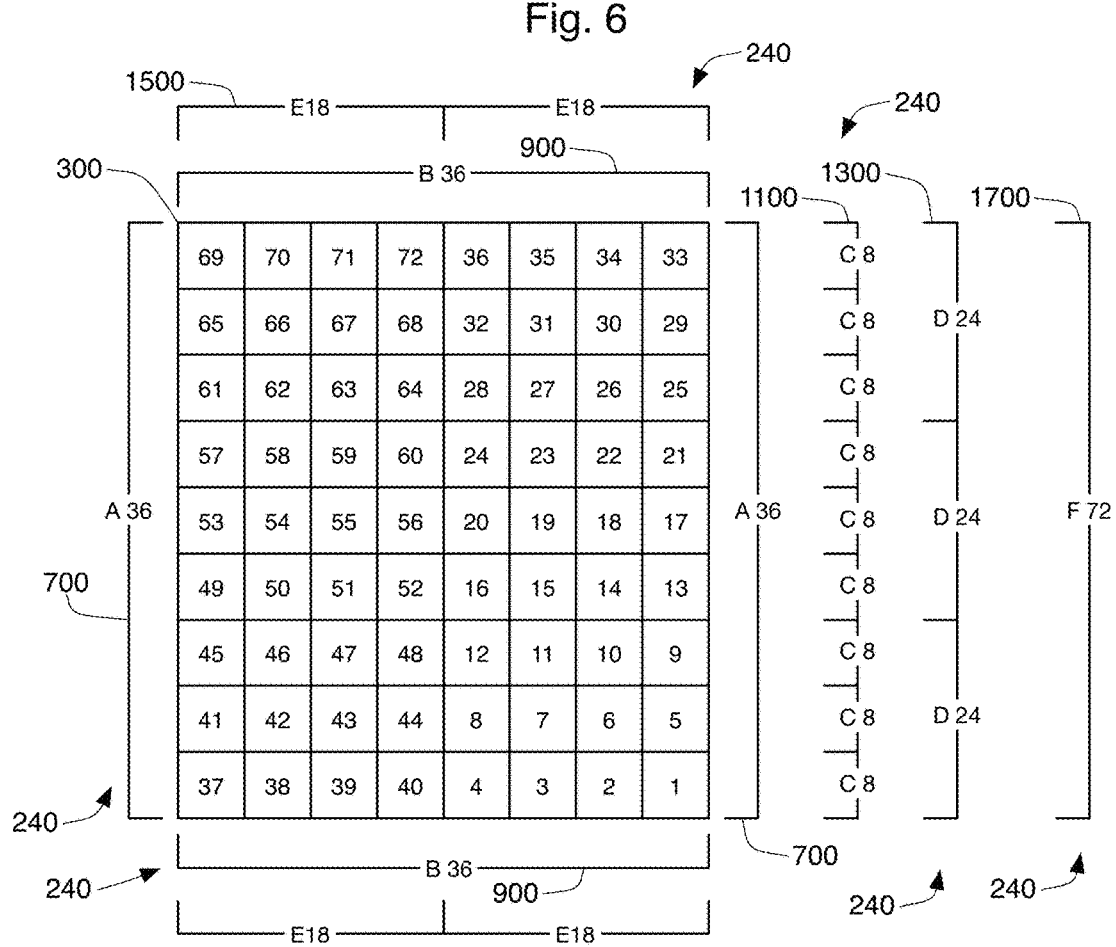
FIG. 6 is a schematic view of six dimension layers that each divide the attributes of the data array of FIG. 3 into dimensions.

As shown in FIG. 2, multiple dimension layers 240 can be layered over the attribute data 230. In one embodiment, where the attribute data 230 is arranged into the 8×9 attribute array 300, the particular dimension layers 240 shown in FIG. 6 can be utilized. Each of these dimension layers 240 divides the seventy-two attributes 110 in the array into different sets of dimensions 120. In all, FIG. 6 shows six different dimension layers 240 for dividing up the array 300, each of which are described in more detail below.

Dimension layer A 700 divides the array into two different dimensions 120 that each integrate thirty-six different attributes 110. Dimension layer 700 is shown in more detail in FIG. 7, which shows attributes 37-72 shaded in black while attributes 1-36 are shaded in white. Dimension layer 700 is an "hemisphere" dimension because it divides the total number of attributes in the array 300 in half. In particular, dimension layer 700 divides the array 300 into a left or west dimension 710 and a right or east dimension 720. West dimension 710 is labeled "sustain" in FIG. 7, which reflects the use of dimension 710 in connection with the executive leadership attributes 400 shown in FIGS. 4 and 5. The east dimension 720 is labeled "build." In the context of the leadership attributes 400, the sustain dimension 710 relates to a leader's business sustaining capacity, while the build dimension 720 relates to the leader's business building capacity.

Figures 7, 8:
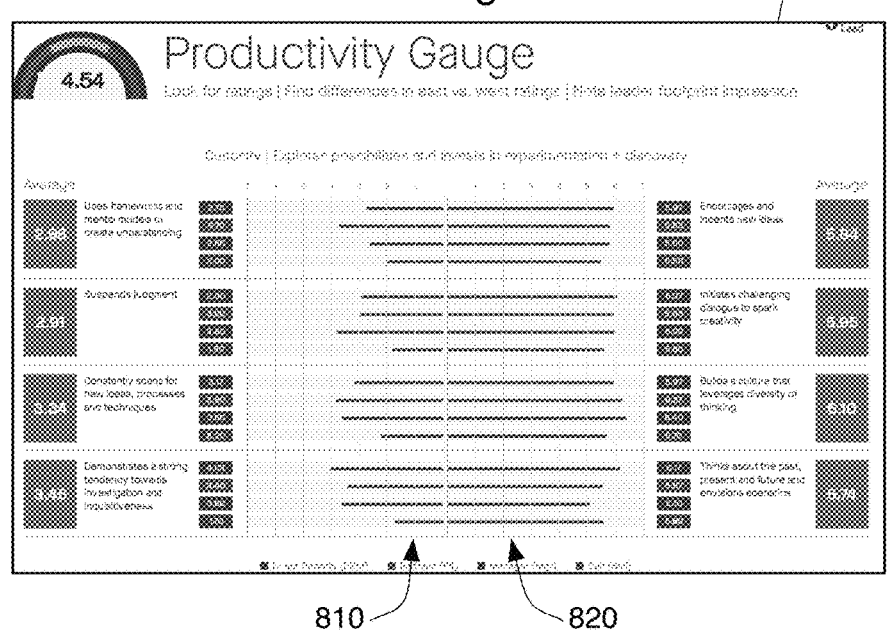
FIG. 7 is a schematic view of a dimension layer dividing the attributes of the data array of FIG. 3 into dimensions.
FIG. 8 is a user interface utilizing the dimensions created by the dimension layer of FIG. 7.
Figure 11:
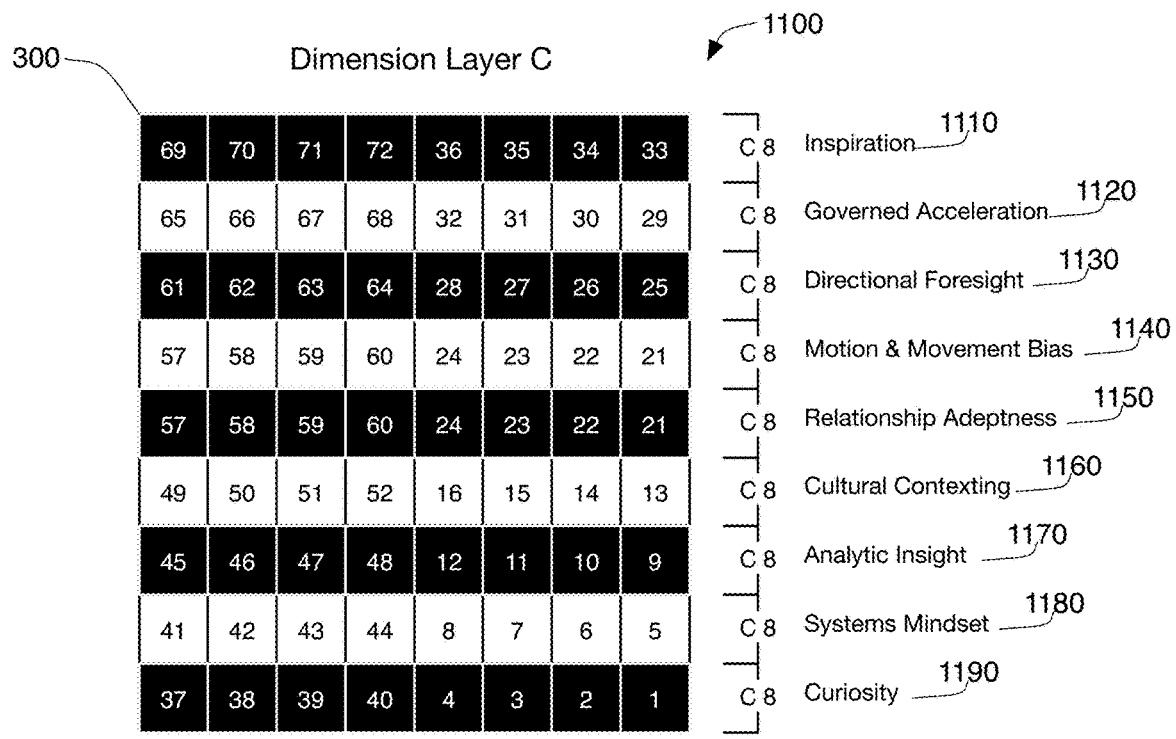
FIG. 11 is a schematic view of a dimension layer dividing the attributes of the data array of FIG. 3 into dimensions.

FIG. 8 shows a user interface 800 in which dimension layer A 700 is utilized in the context of the executive leadership attributes 400. This interface can be created by a reporting configuration 250 associated with dimension layer A 700. While it would be possible to combine all of the attributes in the sustain dimension 710 into an average score for that dimension 710, and likewise compute an average score for the build dimension 720, interface 800 does not do this explicitly. Instead, this interface presents scores for four attributes 110 that are part of the sustain dimension 710 on the left side 810 of the interface 800 and presents scores for four attributes 110 that form part of the build dimension 720 on the right side 820. In particular, the left side 810 shows attributes 110 with numbers 111 ranging from 37-40 on the left side 810 and from 1-4 on the right side 810. As explained below in connection with FIG. 11, these eight attributes 110 (numbers 1-4 and 37-40) are considered to relate to a curiosity dimension 120. Although all eight dimensions 120 relate to curiosity, it is clear visually that the subject 130 scored much higher on the attributes relating to the build dimension 720 than the attributes relating to the sustain dimension 710. Thus, this is an example where the dimensions 710, 720 from a dimension layer 700 are not displayed as calculated averages, but as a visualized grouping and separation of attributes 110. Note that four separate scores are presented in interface 800 for each displayed attribute 110. The top of these four scores is provided by direct reports to the subject 130, the second for peers, the third for managers or bosses of this subject 130, and the fourth is a self-score entered by the subject herself. As explained above, the ability to group evaluators 140 in this way allows for this type of visual presentation of how the subject 130 is seen by different types of evaluators 140.

Figures 9, 10:
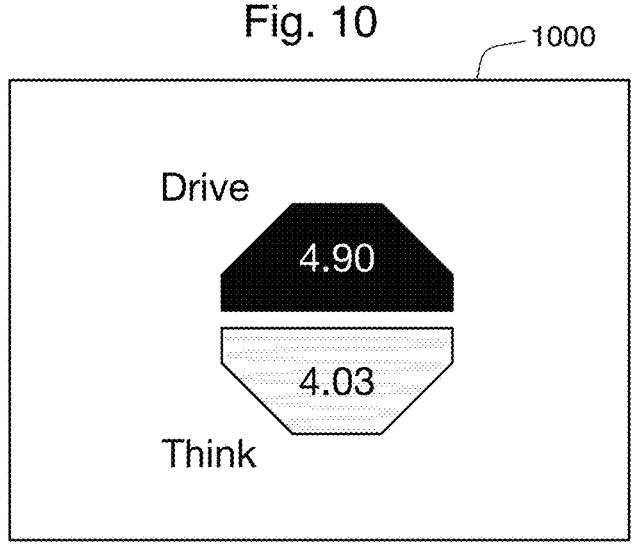
FIG. 9 is a schematic view of a dimension layer dividing the attributes of the data array of FIG. 3 into dimensions.
FIG. 10 is a user interface utilizing the dimensions created by the dimension layer of FIG. 9.

Dimension layer B 900, as shown in FIG. 9, is also a hemispheric dimension layer, but in this case the array 300 is divided into a north dimension 910 and a south dimension 920. In the context of executive leadership attributes 400, this dimension layer 900 divides the attributes into a "drive" dimension 910 and a "think" dimension 920. The user interface 1000 in FIG. 10 shows that these two dimensions 910, 920 were analyzed and a numeric value or score was associated with each of them. In other words, unlike interface 800, which did not explicitly show a score or average for the dimensions 710, 720, interface 1000 relies upon and displays a score for each dimension 910, 920. This score may be a simple average of the scores for each attribute 110 that makes up the dimension 910, 920, or the score may be calculated using a different mathematical algorithm (such as a median, or a weighted average, or an average after removing outlier values, or some other type of aggregation function). If the dimensions 910, 920 are based on the average value of their underlying attributes 110, the drive dimension 910 would be the average of attributes 19-36 and 55-72, and the think dimension 920 would be the average of attributes 1-18 and 37-54. The reporting configuration 250 associated with dimension layer 900 included instructions to create the interface 1000 that showed these values and the appropriate labels for the dimensions 910, 920.

Dimension layer C 1100 shows a row-type dimension layer 240 in that it divides the attribute array 300 into nine different rows of eight attributes 110 each, with each dimension 1110-1190 comprising a single row of attributes 110. In the context of the executive leadership analysis attributes 400, these nine dimensions are inspiration 1110, governed acceleration 1120, directional foresight 1130, motion & movement bias 1140, relationship adeptness 1150, cultural contexting 1160, analytic insight 1170, systems mindset 1180, and curiosity 1190. A comparison between this dimension layer C 1100 and dimension layer A 700 of FIG. 7 reveals that any one of the row dimensions, such as the curiosity dimension 1190, will be part of the two different dimensions 710, 720 in dimension layer 700. In other words, dimension layer C 1100 can be considered to conflict with dimension layer A 700 because any dimension 120 in either of these two layers 700, 1100 will be split or divided into two or more dimensions in the other layer 700, 1100. This "conflict," however, does not prevent both dimension layers 700, 1100 from being simultaneously valuable, as is shown in interface 800 in which the attributes of the curiosity dimension 1190 are visually divided into the sustain dimension 710 and build dimension 720.

Figure 12:
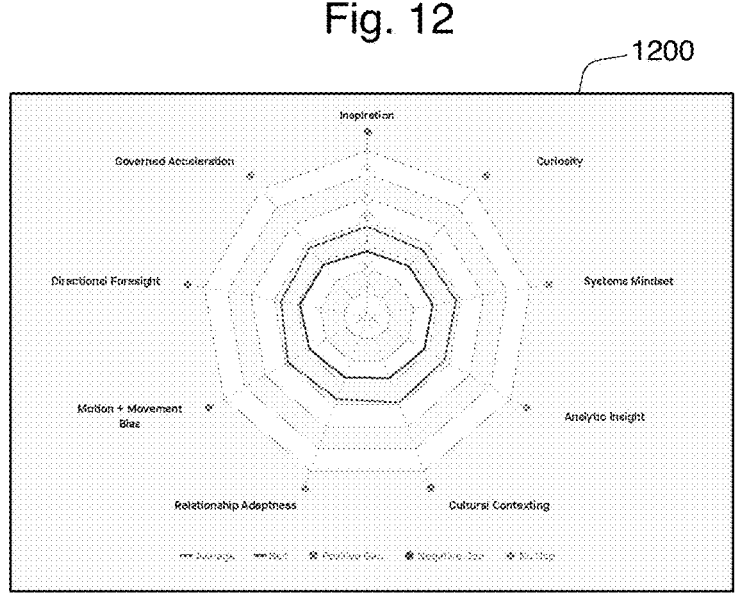
FIG. 12 is a user interface utilizing the dimensions created by the dimension layer of FIG. 11.

FIG. 12 shows a user interface 1200 that focuses on scores calculated for each of the dimensions 1110-1190 in this dimension layer 1100. In this case, the reporting configuration 250 associated with dimension layer C 1100 created a radar or spider chart, which displays the values of all dimensions 1110-1190 in this dimension layer 1100 on a single 2D graph. In this case, the graph compares an average score in the dimensions 1110-1190 submitted by evaluators 140 against a self-score submitted by the subject 130.

Figures 13, 14:
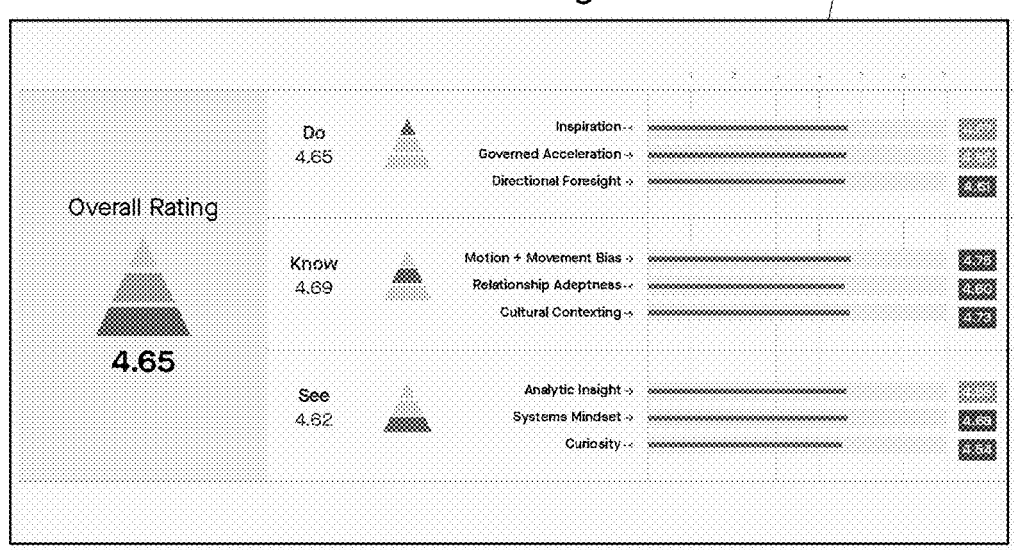
FIG. 13 is a schematic view of a dimension layer dividing the attributes of the data array of FIG. 3 into dimensions.
FIG. 14 is a user interface utilizing the dimensions created by the dimension layer of FIG. 13.

FIG. 13 shows dimension layer D 1300, which divides the attribute array 300 into three equal dimensions 1310, 1320, and 1330. The first dimension 1310 (the "do" dimension 1310 in the context of executive leadership analysis attributes 400) consists of the top three rows of the attribute array 300, the second dimension 1320 ("know") consists of the middle three rows, and the third dimension 1330 ("see") consists of the bottom three rows. If dimension layer D 1300 is compared with dimension layer C 1100, dimensions 1310, 1320, and 1330 will be seen to be super-dimensions similar to super-dimension 126 of FIG. 1. For example, the do dimension 1310 relates to the exact same attributes as the combination of the inspiration dimension 1110, the governed acceleration dimension 1120, and the directional foresight dimension 1130. Similarly, the middle dimension 1320 is a super-dimension of dimensions 1140, 1150, and 1160, while the lower dimension 1330 is calculated based on dimensions 1170, 1180, and 1190. While one of the unique features of the present invention is that dimension layers 240 are independent from each other (such as dimension layer A 700 being independent from dimension layers B 900, C 1100, and D1300), it is still possible to define some dimension layers 240 as super-dimensions made by combining dimensions defined in other dimension layers 240. Of course, the definition of dimensions 1310, 1320, and 1330 in dimension layer D 1300 will, in actuality, be implemented based on the underlying attributes 110 instead of previously defined dimensions 120. For example, dimension 1310 will be defined by the combination of attributes 25-36 and 61-72 as opposed to the combination of dimensions 1110, 1120, and 1130.

The relationship between dimension layers 1100 and 1300 is seen in interface 1400 shown in FIG. 14. This interface 1400 will be created by the reporting configuration 250 associated with the dimension layer 1300. The do dimension 1310 is shown as having a score or value of 4.65, with the related inspiration dimension 1110, governed acceleration dimension 1120, and directional foresight dimension 1130 have scores of 4.67, 4.65 and 4.61, respectively. Likewise, the score for the know dimension 1320 is shown alongside scores for the motion & movement bias dimension 1140, relationship adeptness dimension 1150, and the cultural contexting dimension 1160. Finally, the score for the see dimension 1330 is shown alongside scores for the analytic insight dimension 1170, the systems mindset dimension 1180, and the curiosity dimension 1190. This ability to include a hierarchy involving super-dimensions, shown in interface 1400 as well as the division of dimensions resulting from conflicting dimensions, shown in interface 800, is made possible by the use of a plurality of dimension layers 240 that can be laid over the underlying attribute data 230.

Figure 15:
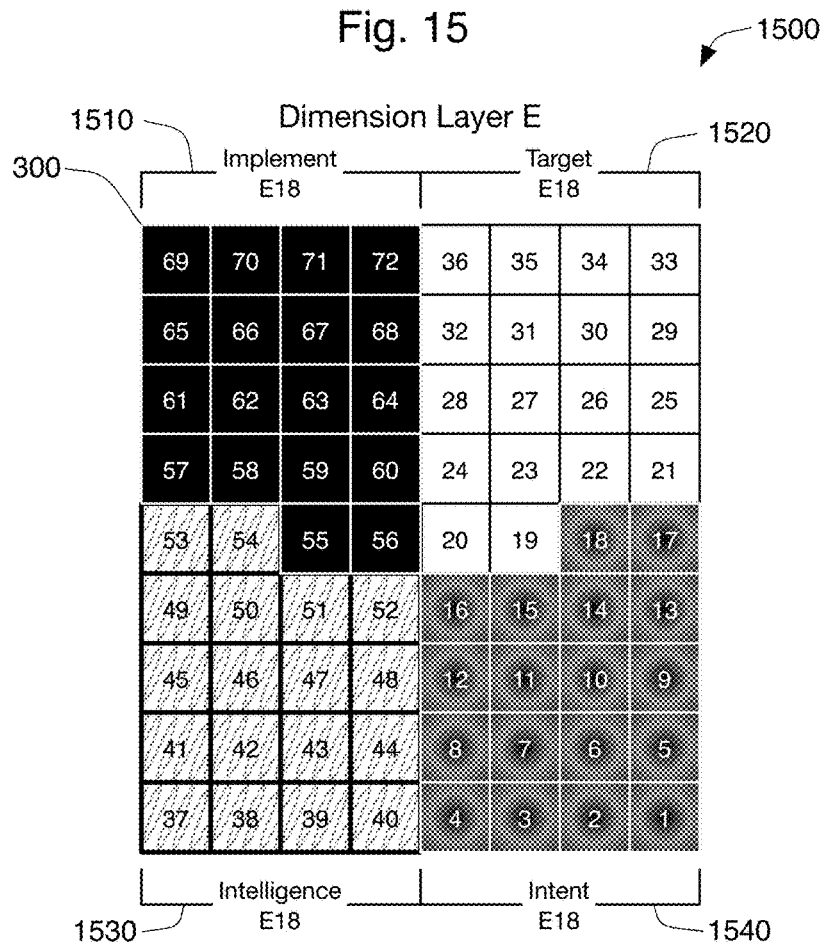
FIG. 15 is a schematic view of a dimension layer dividing the attributes of the data array of FIG. 3 into dimensions.

FIG. 15 shows dimension layer E 1500, which divides the attribute array 300 into four quadrant dimensions 1510, 1520, 1530, and 1540, which are labeled "implement," "target," "intelligence," and "intent," respectively, in the context of executive leadership analysis attributes 400. Dimension layer E 1500 shows, once again, that dimensions layers 240 can be defined independently from each other, with this dimension layer 1500 clearly dividing (or conflicting with) the dimensions 120 formed by dimension layers C 1100 and D 1300. While the quadrant dimensions 1510-1540 are defined along the same boundary lines that divided the hemispheric dimension layers A 700 and C 900, these quadrant dimensions 1510-1540 also divide in half each of the hemispheric dimensions 710, 720, 910, and 920.

Figure 16:
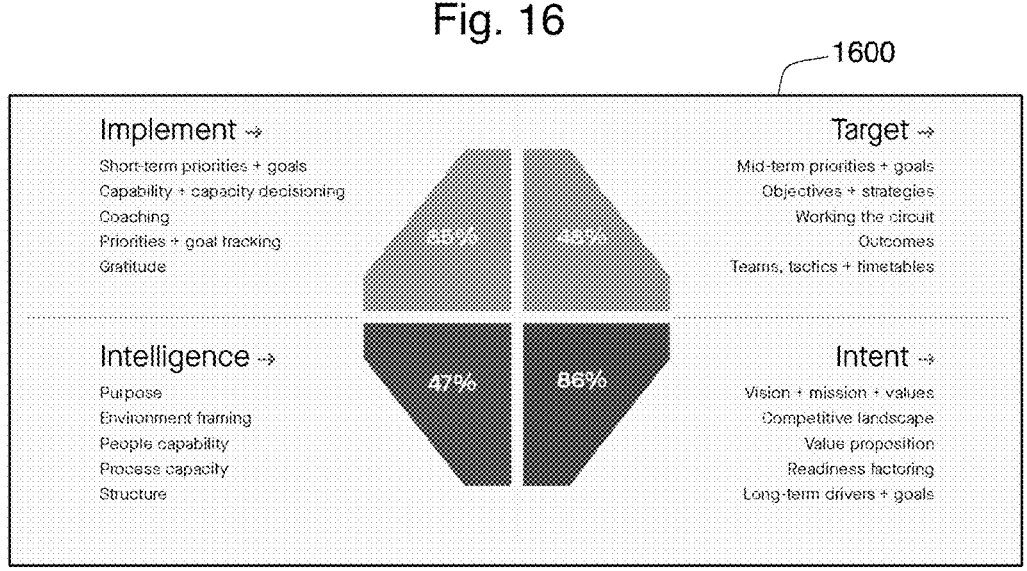
FIG. 16 is a user interface utilizing the dimensions created by the dimension layer of FIG. 15.

The reporting configuration 250 associated with dimension layer E 1500 results in a report on the subject's score in each of these quadrant dimensions 1510-1540, as is shown in interface 1600 of FIG. 16. The reporting configuration provides the name of each quadrant dimension 1510-1540, as well as descriptive words and the overall formatting of the interface 1600. The interface then presents a score for each dimension 1510-1540 and colorizes the graphic that shows the score according to the value of the score relative to the other quadrants, with the highest scoring quadrant being presented in green, the lowest in red, and the middle two quadrants in yellow. It is important to note that the scores associated with these dimensions 1510-1540 as shown in interface 1600 are not average scores but rather are presented in terms of percentages. These percentage scores are created based on a percentage of the subject's actual value or score on these dimensions 1510-1540 with respect to the highest possible score available for those dimensions 1510-1540.

In one embodiment, the quadrant dimensions 1510-1540 are grouped together in pairs, with the implement dimension 1510 and the intent dimension 1540 being grouped into an "engagement corridor" and the target dimension 1520 and the intelligence dimension 1530 being grouped into an "alignment corridor." While it is not always necessary to group quadrant dimensions 1510-1540 into pairs in this manner, the inventors have found it useful to report on these groupings in the context of leadership analysis.

FIG. 17 shows a dimension layer F 1700 that creates only a single dimension 1710 that reflects the combination of all of the attributes 110 in attribute array 300. If dimension layers 240 are considered layers that define two or more dimensions in the attribute array 300, this layer F 1700 and its single dimension 1710 would not be considered an actual dimension layer 240. The reporting configuration 250 for this dimension layer 1700 need only present a single score for this overall dimension 1710. In FIG. 18, however, the interface 1800 shows the score for the overall dimension 1710 in the context of the scores for the quadrant dimensions 1510-1540.

Method 1900

FIG. 19 shows a flow chart describing a method 1900 for implementing one embodiment of the present invention. The method begins with step 1910, in which a logical shape for attribute data 230 is determined. As explained above, it is possible to implement the attribute data 230 as the 8×9 2D attribute array 300 shown in FIG. 3. Other rectangular shapes are also possible, such as an 8×8 array, a 9×9 array, etc. The 8×9 array shape is particularly useful in that it allows for:

1) hemispheric dimensions 710, 720, 910, 920 each being related to thirty-six attributes 110
2) nine separate row dimensions 1110-1190 each associated with eight attributes,
3) three super-dimensions 1310-1330 each associated with three of the row dimensions 1110-1190, and
4) four quadrant dimensions 1510-1540, each associated with eighteen attributes.

The ability to define dimension layers 240 that equally divide all attributes 110 into separate dimensions 120 is one of the primary benefits of organizing a total of seventy-two attributes into an 8×9 logical array. An 9×9 array of eighty-one attributes could not be equally divided into two hemispheric dimensions or into for quadrant dimensions. Similarly, an 8×8 array of sixty-four attributes could not be divided into three equal super-dimensions. However, an 8×8 array could be divided into hemispheric dimensions, quadrant dimensions, row dimensions, and four super-dimensions each associate with two (instead of three) row dimensions. Thus, an 8×8 array may be useful if the analysis of the attributes 110 works better with four super-dimensions instead of three. In other embodiments, it is possible to define a geometric shape for the attribute data 230 that is not rectangular.

At step 1920, it is necessary to define dimension layers 240 for the selected geometric shape of the attribute data 230. These dimension layers 240 each define multiple dimensions 120 by combining multiple attributes 110 that neighbor each other in the selected geometric shape for the attribute data 230. Attributes 110 that neighbor each other are considered part of a neighboring group of attributes 110. In the preferred embodiment, each dimension 120 in a dimension layer 240 layer is associated with the same number of attributes 110. Furthermore, in the preferred invention, all attributes 110 in the geometric shape will be utilized in defining dimensions for the dimension layer, with each attribute 110 being associated with only a single one of the dimensions 120.

Steps 1922-1928 are presented in dashed outlines to indicate that these steps are possible steps to be taken when determining that dimension layers 240 under step 1920. Step 1922 indicates that one dimension layer 240 will be hemispheric, such as dimension layers A 700 and B 900. Step 1924 provides that one dimension layer will comprise rows in the geometric shape, such as dimension layer C 1100. Step 1926 describes the fact that one dimension layer 240 can define super dimensions of another dimension layer 240, such as dimension layer D 1300 when compared with layer C 1100, and that one dimension layer 240 can define dimensions 120 that conflict with the dimensions of another, such as dimension layer C 1100 and dimension layer A 700. Finally, step 1928 indicates that a dimension layer 240 can be defined that creates quadrant dimensions 120, such as dimension layer E 1500. It is not required that all of steps 1922-1928 are executed as part of step 1920, but the preferred embodiment does so. It is preferred that at least three different dimension layers 240 be utilized in method 1900 to ensure a comprehensive evaluation of the attribute data 230.

Step 1930 requires that attributes 110 be selected for the geometric shape of the attribute array selected in step 1910 and for the defined dimension layers 240 of step 1920. Table 400 of FIGS. 4 and 5 show one set of attributes 110 that were particularly selected for the 8×9 attribute array 300 and the various dimension layers 240 shown in FIG. 6. Obviously, the selection of actual attributes 110 is a difficult process, because it is important to select and organize the attributes 110 so that neighboring groups of attributes 110 are created in the selected logical shape to enable the defined dimension layers 240 to create dimensions 120 having value in the real world.

Step 1930 can occur after the number and logical arrangement of attributes 110 are determined in step 1910. The "selection of attributes" that takes place in this step is, in effect, the selection of a label for the attribute 110. FIG. 3 shows that attribute number 1 exists in the attribute array, and that it is a neighbor of attributes 2 and 5. Attribute 1 exists, but it has no real world meaning. Even if it is known that attribute 1 has a value of "5.2," this means nothing without context. The label assigned to attribute 1 gives it this context. In table 400, attribute 1 has the label "Thinks about the past, present and future and envisions scenarios." The label gives real world meaning to attribute 1 in the context of executive leadership analysis. Thus, step 1930 can be considered the application of a label onto the configuration of attributes created in step 1910.

As explained above, the inventors of the present application have created a plurality of attribute sets like the executive leadership attributes in table 400 that work effectively in the 8×9 data array 300 and the dimension layers 240 shown in FIG. 6. That does not mean, however, that the determination of the geometric shape in step 1910 and the creation of the dimension layers in step 1920 must always take place before the attribute labels are selected in step 1930. These attribute labels could be selected first, and the geometric shape selection and dimension layer determination of steps 1910 and 1920 could occur later.

At step 1940, evaluator input 270 is received from evaluators 140 that score or rate the subject 130 on the selected attributes 110. Ideally, multiple evaluators 140 of different types (think direct reports, peers, superiors, and self) are utilized to create a rich mix of evaluation data for each attribute 110. This data is then stored as attribute data 230, which can then be analyzed in the selected logical shape from step 1910.

At step 1950, multiple ones of the dimension layers 240 are analyzed in order to create the dimensions 120 defined by each layer 240. As explained above, these created dimensions 120 are generally associated with a score or rating based on aggregating the scores or ratings of the neighboring group of attributes 110 that define the dimensions 120 in the layer 240.

At step 1960, dimension layers 240 (or their defined sets of dimensions 120) are selected for a report desired by a data user 290. It is not necessary that all dimension layers 240 be selected, but in some embodiments a comprehensive report on a subject 130 would include all defined layers 240.

At step 1970, the reporting configurations 250 for the selected dimension layers 240 are identified. These reporting configurations 250 provide labels and descriptions for the dimensions 120 created in the context of the selected attributes 110. As explained above, these reporting configurations 250 need not be separate entities in the structured data 220 accessed by the server(s) 210. They can, for example, be integrated into the dimension layers 240. In addition, a review of the user interfaces shown in FIGS. 8, 10, 12, 14, 16, and 18 reveals that many of these interfaces describe or include scores for dimensions 120 that were defined on multiple dimension layers 240. This shows that there need not be a strict one-to-one relationship between reporting configurations 250 and dimension layers 240, especially with respect to the formatting instructions used for reports and user interfaces.

Finally, in step 1980, the attribute data received at step 1940, the selected dimension layers from step 1960, and the reporting configurations 250 identified in step 1970 are used to generate one or more reports on the subject 130. These reports can be shared through user interfaces, through paper reports, through PDF documents, or any similar technique with data users 290 that request this information. The method 1900 then ends at step 1990.

Enterprise Evaluation

In yet another embodiment, evaluator input 270 is collected in step 1940 in connection with a plurality of subjects 130. For instance, an enterprise may want to use method 1900 to evaluate a plurality of officers within the enterprise. In this context, not only can separate reporting be generated for each subject at step 1980, it is also possible to combine the date from these plurality of subjects 130 into one set of enterprise-relevant data. The combined data set can they be evaluated through steps 1950-1970, and a report on the combined set of subjects (the entire enterprise) can be generated at step 1980. In some embodiments, certain values for certain dimensions are not generated for individual subjects but are generated for the enterprise as a whole. For example, values for hemispheric dimensions 710, 720, 910, 920 might not be generated for individual subjects, but would be generated for the enterprise.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A method of organizing and reporting on evaluation data comprising:
   a) determining a geometric shape for attribute data comprising a plurality of attributes logically arranged into the geometric shape, wherein the plurality of attributes have neighboring attributes within the geometric shape;
   b) determining a plurality of dimension layers, each dimension layer comprising a plurality of dimensions, each dimension being associated with a neighboring group of attributes within the geometric shape; the plurality of dimension layers comprising:
      i) a first dimension layer comprising a first set of dimensions;
      ii) a second dimension layer comprising a second set of dimensions, wherein each dimension in the second set of dimensions is a super-dimension of multiple dimensions in the first set of dimensions; and
      iii) a third dimension layer comprising a third set of dimensions, wherein the third set of dimensions conflicts with the first set of dimensions such that the neighboring group of attributes associated with any dimension in the third set of dimensions are split between multiple dimensions in the first set of dimensions and the neighboring group of attributes associated with any dimension in the first set of dimensions are split between multiple dimensions in the third set of dimensions;
   c) determining attribute labels for the plurality of attributes, the attribute labels selected so that neighboring groups of attributes associated with each dimension defined by the plurality of dimension layers share commonalities;
   d) receiving evaluator input from a plurality of evaluators concerning a subject, the evaluator input providing attribute values for the plurality of attributes based on the attribute labels;
   e) applying the plurality of dimension layers against the attribute values by, for each of the plurality of dimension layers, evaluating the set of dimensions of that dimension layer against the attribute values by, for each of the dimensions in the set of dimensions, determining a dimension value for the dimension by aggregating the attribute values of the neighboring group of attributes associated with the dimension; and
   f) generating report output based on the application of the plurality of dimension layers against the attribute values.

2. The method of claim 1, wherein the geometric shape is rectangular.

3. The method of claim 2, wherein the geometric shape is an 8×9 array.

4. The method of claim 2, wherein the first set of dimensions comprises a set of row dimensions.

5. The method of claim 4, wherein the third set of dimensions comprises hemisphere dimensions.

6. The method of claim 4, wherein the third set of dimensions comprises quadrant dimensions.

7. The method of claim 1, wherein reporting configuration data identifies dimension labels for each of the dimensions in the first, second, and third sets of dimensions, further wherein the step of generating report output further comprises identifying dimension labels for the dimensions in the reporting configuration data.

8. The method of claim 1, wherein the plurality of dimension layers and the plurality of attributes are stored as data constructs within a database.

9. The method of claim 8, wherein the geometric shape associates a numeric value with each attribute within the geometric shape, further wherein each of the plurality of attributes is associated with a single one of the numeric values.

10. The method of claim 8, wherein reporting configuration data is further stored as data constructs within the database, wherein the reporting configuration data identifies dimension labels for each of the dimensions in the first, second, and third sets of dimensions, further wherein the step of generating report output further comprises identifying dimension labels for the dimensions.

11. The method of claim 10, wherein the reporting configuration data is stored separately from the dimension layers within the database.

12. The method of claim 1, further comprising a repetition of step d) in order to generate enterprise data on a plurality of subjects, further comprising applying the plurality of dimension layers against the enterprise data and generating report output based on the application of the plurality of dimension layers against the enterprise data.

13. The method of claim 1, wherein the report output comprises the dimension values for multiple dimensions in each of the first, second, and third sets of dimensions.

14. The method of claim 1, wherein each of the set of dimensions equally divides the plurality of attributes between the dimensions that comprise the set of dimensions, so that the neighboring groups of attributes for the dimensions in one dimension layer each contain the same number of attributes.

15. The method of claim 14, wherein all of the plurality of attributes in the attribute data are included in a single dimension within any of the set of dimensions.

16. A system comprising:
   a) a server having a processor and memory;
   b) a database for managing and updating structured data, the database comprising:
      i) attribute data comprising a plurality of attributes,
      ii) a logical geometric shape that defines a logical arrangement of the attribute data, wherein the logical arrangement ensures that each attribute in the attribute data has neighboring attributes,
      iii) a plurality of dimension layers, each dimension layer comprising a plurality of dimensions, each dimension being associated with a neighboring group of attributes within the logical geometric shape, the plurality of dimension layers comprising:
         (1) a first dimension layer comprising a first set of dimensions,
         (2) a second dimension layer comprising a second set of dimensions, wherein each dimension in the second set of dimensions is a super-dimension of multiple dimensions in the first set of dimensions,
         (3) a third dimension layer comprising a third set of dimensions, wherein the third set of dimensions conflicts with the first set of dimensions such that the neighboring group of attributes associated with any dimension in the third set of dimensions is split between multiple dimensions in the first set of dimensions and the neighboring group of attributes associated with any dimension in the first set of dimensions is split between multiple dimensions in the third set of dimensions, and
      iv) an attribute label associated with each of the plurality of attributes, the attribute labels being selected so that neighboring groups of attributes associated with each dimension defined by the plurality of dimension layers share commonalities; and
   c) software programming residing in the memory for programming the processor to:
      i) receive evaluator input from a plurality of evaluators concerning a subject, the evaluator input providing attribute values for the plurality of attributes based on the attribute labels;
      ii) apply the plurality of dimension layers against the attribute values by, for each of the plurality of dimension layers, evaluating the set of dimensions of that dimension layer against the attribute values by, for each of the dimensions in the set of dimensions, determining a dimension value for the dimension by aggregating the attribute values of the neighboring group of attributes associated with the dimension; and
      iii) generate report output based on the application of the plurality of dimension layers against the attribute values.

17. The system of claim 16, wherein each of the set of dimensions equally divides the plurality of attributes between the dimensions that comprise the set of dimensions, so that the neighboring groups of attributes for the dimensions in one dimension layer each contain the same number of attributes.

18. The system of claim 17, wherein all of the plurality of attributes in the attribute data are included in a single dimension within any of the set of dimensions.

19. The system of claim 16, wherein the logical geometric shape comprises an 8×9 rectangular array.

20. The system of claim 16, the logical geometric shape associates a numeric value with each attribute within the logical arrangement, further wherein each of the plurality of attributes is associated with a single one of the numeric values.

* * * * *